United States Patent Office 3,125,592
Patented Mar. 17, 1964

3,125,592
PREPARATION OF POLYMERIZABLE VINYLATED COMPOUNDS
Charles S. Nevin, Decatur, Ill., assignor to A. E. Staley Manufacturing Company, Decatur, Ill., a corporation of Delaware
No Drawing. Filed June 26, 1961, Ser. No. 119,340
19 Claims. (Cl. 260—405)

This invention relates broadly to the preparation of vicinal vinylacyloxy-hydroxy long chain organic compounds. More specifically, it relates to the preparation of vinylated compounds containing at least one chain of 10–24 carbon atoms and including at least one vicinal vinylacyloxy-hydroxy segment

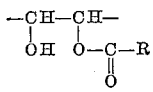

where R is a monovinylated aliphatic radical of limited structure as described hereinafter. Still more specifically, it relates to the acylation of epoxy aliphatic compounds having at least one chain of 10–24 carbon atoms including at least one oxirane segment

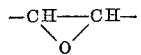

with vinyl aliphatic monocarboxylic acids of limited structure in the presence of a vinyl polymerization inhibitor system.

An important object of the invention is provision of a general method for preparing polymerizable vinylated long chain organic compounds. Another object is suppression of vinyl polymerization during the acylation reaction of this invention, by means of an efficient inhibitor system, whereby the reaction products, without additional treatment for removal or inactivation of residual inhibitor, may be easily polymerized later with polymerization initiators.

Another object is provision of efficient catalysts for promoting acylation of vicinal epoxy compounds with vinyl aliphatic carboxylic acids. Additional objects will appear in the following description of the invention.

According to this invention, the polymerizable vinylated long chain organic compounds are prepared by heating a vicinal epoxy long chain organic compound with a vinyl aliphatic monocarboxylic acid in the presence of a vinyl polymerization inhibitor system. The predominant reaction is acylation of the long chain compound by the vinyl acid, i.e., opening of an oxirane ring in the former with the carboxyl group of the latter to yield a vicinal vinylacyloxy-hydroxy derivative. The predominant reaction product may also be regarded as a hydroxy long chain aliphatic ester of the vinyl acid. The final reaction mixture is a homogeneous liquid, frequently quite viscous at room temperature. It may contain small proportions of secondary reaction products, and it may be diluted with substantial proportions of unaltered reactants. The polymerization inhibitor system of the invention suppresses polymerization of the reactants and of the reaction product, both of which are monomeric vinyl compounds.

Preparation of the vinylated long chain compounds is typified by the reaction of one mol of acrylic acid with one mol of the 2-ethylhexyl ester of 9,10-epoxystearic acid according to the following equation:

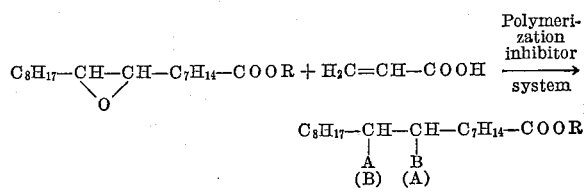

where A is hydroxyl, B is acryloxy, and R is 2-ethylhexyl. A mixture of the 2-ethylhexyl esters of 9-acryloxy-10-hydroxystearic acid and 9-hydroxy-10-acryloxystearic acid is obtained because the carbon-oxygen bonds in the oxirane ring are opened singly and randomly by the carboxyl group of the acrylic acid.

When one mol of acrylic acid is reacted with one mol of the 2-ethylhexyl ester of 9, 10-12, 13-diepoxystearic acid according to the present invention, the reaction product consists chiefly of a mixture of the several isomeric epoxy hydroxy acryloxy stearates with the several isomeric doubly hydroxylated and acryloxylated stearates.

In the absence of catalysts which promote opening of the oxirane ring with carboxyl, a vinyl acid and an epoxy compound (such as epoxidized soybean oil) are heated together for 4–8 hours at 120–160° C. to obtain maximum acylation. The elevated temperature and extended time lead to considerable vinyl polymerization in the reaction mixture, particularly in the case of the more highly reactive acrylic monomers, e.g., the methacrylates. Some of the free vinyl carboxylic acid, e.g. methacrylic acid, is homopolymerized. Some of the monomer reaction product, e.g., vicinal methacryloxy-hydroxy soybean oil, is homopolymerized and some of the free vinyl acid copolymerizes with the monomeric reaction product. This occurs, under the foregoing reaction conditions, even though the vinyl carboxylic acid contains the usual amount of free radical inhibitor to provide storage stability. Polymerization during the acylation reaction is undesirable because it erratically alters the viscosity and polymerization characteristics of the reaction product although it may still be usable.

Proper suppression of vinyl polymerization during the acylation reaction is an important feature of my invention. By means of this feature, my invention provides acylation reaction products of uniform viscosity and polymerization characteristics. Furthermore, and of great practical importance, this feature permits the reaction products to be polyemrized afterward without the expense and inconvenience of additional treatment for removal or inactivation of residual polymerization inhibitor. I have found that a combination of gaseous oxygen and organic free radical inhibitor is a superior vinyl polymerization inhibitor system for the acylation reaction. Used alone, many of the known organic free radical inhibitors, e.g., quinone, hydroquinone, paramethoxyphenol, diphenylamine and methylene blue, will suppress vinyl polymerization if present at sufficient concentration in the acylation reaction mixture. When these are used alone, a relatively high concentration is necessary, and this is unsatisfactory because it requires inconvenient and expensive removal from the reaction mixture, if they are removable at all, to prevent interference with subsequent polymerization. By combining gaseous oxygen with an organic free radical inhibitor, the concentration of the latter in the acylation reaction mixture can be reduced to the point where the residual organic inhibitor does not objectionably interfere with vinyl polymerization later or require excessive polymerization initiator and prolong the polymerization induction period.

Gaseous oxygen in combination with an organic free radical inhibitor is an excellent polymerization inhibitor in the reaction; it is effective at elevated reaction temperatures and it is only very slightly soluble in the reaction mixture. It leaves no residual in the reaction products. In using gaseous oxygen in accordance with this invention, through contact between the liquid reaction mixture and the oxygen, or oxygen-containing gas mixture (e.g., air) should be maintained during the acylation reaction. This may be accomplished by sparging or vigorously bubbling oxygen or air through the reaction mixture. Alternatively, the reaction mixture may be whipped or vigorously stirred in contact with a supply of oxygen or air. Another method is to whip air (or oxygen) into the reactants, e.g., the epoxidized aliphatic compound, under such conditions that the gas is trapped in the liquid; sparging or vigorous agitation is useful for this purpose. Preferably, the pressure of the sparging or contacting gas is atmospheric, but satisfactory inhibition of vinyl polymerization can be obtained at both higher and lower pressures. When large quantities of materials are reacted, vigorous mixing or agitation is difficult and it is virtually necessary, for this practical reason, to resort to sparging with an oxygen-containing gas.

Phenolic compounds comprise the preferred class of organic free radical inhibitors used in combination with the oxygen. Paramethoxyphenol and hydroquinone are the preferred species because they are thermally stable at the acylation reaction temperatures and are substantially unreactive with the epoxy aliphatic compound and vinyl acid at those temperatures. They are effective at low concentrations in the acylation reaction mixture and are easily overcome or neutralized later by vinyl polymerization initiators. At effective concentrations, they do not objectionably discolor the reaction products or polymers derived therefrom. Other effective phenolic inhibitors are tetrachlorohydroquinone and 4-tertiarybutyl catechol.

Other useful inhibitors in different classes of substances are benzoquinone, naphthoquinone, diphenylamine, methylene blue and copper powder. These are somewhat inferior to the preferred inhibitors primarily because their use leads to colored reaction products.

Various other phenolics such as p-hydroxydiphenylamine, 2,5-ditertbutyl hydroquinone, n-propyl gallate, phloroglucinol, phenol, tertiarybutyl methoxyphenol, pyrogallol, tritertoctylphenol, di (2-tertibutyl-4-methyl-1-hydroxy) methane, etc.; amines such as N,N'-diphenylphenylene diamine, N,N'-di-tertoctylphenylene diamine, N,N'-tetraphenylphenylene diamine, di beta naphthol, etc.; inorganics such as sulfur, sulfur dioxide, mercuric oxide, etc.; miscellaneous organics such as hexaphenyl ethane, triphenyl carbinol, p-methoxybenzophenone, etc. are additional, representative polymerization inhibitors.

According to my invention, satisfactory suppression of vinyl polymerization during the acylation reaction is obtained by providing from about 0.01% to about 0.12% by weight of organic free radical inhibitor in the reaction mixture and continuously sparging the mixture with air or oxygen. The lower useful limit of organic free radical inhibitor is about 0.001% by weight of the reaction mixture, depending on the vinyl acid and the proportion present. Proportions above 0.12% by weight may be used, if desired, but above about 0.25% they provide little if any additional benefit and introduce the disadvantages of increased cost, more highly colored reaction products and higher consumption of polymerization initiators in subsequent polymerizations. The foregoing proportions of organic free radical inhibitor include that which may be present initially in the vinyl acid for storage stability.

The acylation reaction time, as previously noted, may be expected to be 4–8 hours at 120 to 160° C. in the absence of catalysts. Temperatures above and below this range are operative, however, provided the reaction time is adjusted to the temperature. The higher temperatures are preferably accompanied by shorter reaction times and the lower temperatures require longer times. The preferred upper limit of acylation reaction temperature is about 175° C. Above this temperature, the advantage of decreased reaction time must be balanced against the disadvantages of greater product discoloration and of greater tendency to premature vinyl polymerization; the latter may be suppressed but only at the cost of using more inhibitor to prevent the premature polymerization, thereby extending the induction period for polymerization. Acylation can be obtained at reaction temperatures above 175° C. and at shortened reaction times, but the color and other important properties of the reaction products become progressively more difficult to control with increasing temperature. The practical upper limit of the acylation temperature is set by the stability of the reactants, since at temperatures much above 300° C. the long chain aliphatic compounds begin to decompose and there is great difficulty in controlling the premature polymerization of such vinyl acids as methacrylic acid. At the other end of the scale, rate of reaction drops off rather sharply below about 120° C., but useful degrees of reaction can be obtained at temperatures of 75–100° C. by greatly extending the reaction time. Even at room temperature, the reaction will proceed but times of the order of weeks or months are necessary to obtain substantial acylation.

I have also discovered that the reaction time is substantially reduced, as much as 75%, for example to about 0.5–2.0 hours, by adding suitable acylation catalysts to the reaction mixture. On the other hand, with a prolonged reaction time and a catalyst, temperatures even below 75° C. can be used, as described before. Accordingly, use of catalysts that promote opening the oxirane ring with carboxyl has the advantage of shortening the time and/or lowering the temperature of the acylation reaction to obtain the same degree of acylation. This in turn reduces the thermal production of free radicals in the reaction mixture and provides the additional advantages of lowered requirements for organic free radical inhibitor and subsequent polymerization initiator. With the proper catalyst, even room temperature can be used to obtain useful products. From this discussion, it is evident that time, temperature and proportion of organic free radical inhibitor are interdependent, that use of an acylation catalyst affects all three and that considerable variation is possible among these variables. The choice of these reaction conditions is readily made by those skilled in the art from the information given and from the examples presented hereinafter.

Superior catalysts for promoting acylation of the vicinal epoxy long chain aliphatic compound with vinyl carboxylic acid are zinc dust, zinc hydrosulfite $(ZnS_2O_4)$, basic zinc sulfoxylate formaldehyde $$(Zn(OH) \cdot HSO_2 \cdot CH_2O)$$

and sodium sulfoxylate formaldehyde $$(NaHSO_2 \cdot CH_2 \cdot 2H_2O)$$

All of them are reducing agents and they have the added advantage of suppressing oxidative formation of color during the acylation reaction. The lower useful ratio of catalyst to epoxy compound is about 0.0005 gram mole of catalyst per gram atom of oxirane oxygen. The economic upper limit of this ratio is about 0.01 gram mol of catalyst per gram atom of oxirane oxygen. Higher catalyst ratios are effective, and may be use if desired, but they provide little if any additional catalysis of the desired reaction.

Preferred ratio of catalyst to epoxy compound ranges from about 0.001 to 0.005 gram moles of catalyst per gram atom of oxirane oxygen. Combinations of two or more of the catalysts are at least as effective as single catalysts, and the weight proportions of the individual catalysts in the combination may be varied over wide ranges.

Other useful catalysts for the acylation reaction are as follows: cadmium acetate, cobalt powder, chromium acetate, isopropyl titanium stearate, magnesium powder, magnesium iodide, sodium bisulfite, sodium carbonate, tertiary butyl titanate, tetramethyl ammonium chloride, zinc acetate, zinc fluoride, zinc iodide, zinc phenolsulfonate, antimony trichloride and tetraisopropyl titanate. They may be used in the same proportions as the preferred catalysts.

When the reaction temperature provides a substantial vapor pressure of the vinyl carboxylic above the reaction mixture, loss of the volatile acid may be prevented by conducting the vapors to a reflux condenser or by carrying out the reaction in a closed vessel, preferably one with a small head space and provision for a supply of oxygen.

My invention is applicable to vicinal epoxy long chain organic compounds broadly. Suitable long chain epoxy compounds are represented by the formula

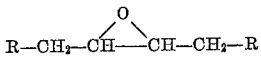

In this formula, each R group is independently hydrogen or monovalent aliphatic group, such that the radical

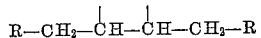

is an open chain of 10 to 24 carbon atoms. For example, one R group may be $CH_3(CH_2)_{15}$—and the other may be—$C(CH_2CH_2CH_3)_3$, the longest continuous open chain having 24 carbon atoms.

One or more hydrogens in the foregoing monovalent aliphatic groups may be replaced with substituents selected from the class consisting of hydroxyl, carboxyl, carboxylate, carbamyl, amino, nitrilo, halo, mercapto, acyloxy, aryloxy and alkoxy. The carboxylate group may be an ester or it may be a salt, e.g., a metal salt, an amine salt or a quaternary ammonium salt. One or both hydrogens of the carbamyl group and of the amino group may be replaced with hydrocarbon groups. In order to represent the various substituents, the symbol —$R_1Y$ may be used in place of R, $R_1$ representing a divalent aliphatic group and Y representing any of the substituents or hydrogen.

Representative epoxy long chain compounds which may be acylated with vinyl carboxylic acids according to my invention are as follows: 4,5-epoxydecane; 9,10-epoxyoctadecane; 9,10-epoxytetracosane; 8,9-epoxy-1-hydroxydecane; 9,10-epoxy-1-hydroxy-octadecane; 9,10-epoxy-6-hydroxy-tetracosane; 4,5-epoxy-1-chlorodecane; 9,10-epoxy-1-bromo-octadecane; 9,10-epoxy-1-chlorotetracosane; 4,5-epoxy-1-nitrilodecane; 9,10-epoxy-1-nitrilooctadecane; 9,10-epoxy-1-nitrilotetracosane; 4,5-epoxy-1-aminodecane; 9,10-epoxy-1-methylamino-octadecane; 9,10-epoxy-1-dioctylaminotetracosane; 4,5-epoxy-1-carbamyldecane; 9,10-epoxy-N-ethyl-1-carbamyloctadecane; 9,10-epoxy-N-dioctyl-1-carbamyl-tetracosane; 9,10-epoxycapric acid; 9,10-epoxystearic acid; 9,10-epoxyricinoleic acid; 9,10-epoxy-pentacosic acid; 4,5-epoxy-decyl-1-acetate; 9,10-epoxystearyl stearate; 9,10-epoxy-1-phenoxy-octadecane; 9,10-epoxy-1-propoxyoctadecane.

The presence of groups in the epoxy long chain compound such as hydroxyl, amino, carboxyl and carbamyl, may lead to side reactions during acylation of the epoxy compound with the vinyl acid. I have found, however, that the extent of such side reaction is small and that the side-reaction products are compatible with the main reaction products and with polymers derived therefrom. The formation of side-reaction products is, in effect, suppressed by the catalysts used to promote the main reaction.

The preferred epoxy long chain compounds and mixtures thereof adaptable to my invention are those which may be readily produced from the natural unsaturated vegetable and animal oils by conventional epoxidation methods. These are considered long chain aliphatic compounds substituted with carboxylate groups. Illustrative examples are epoxidized soybean oil, epoxidized corn oil, epoxidized castor oil, epoxidized cottonseed oil, epoxidized hempseed oil, epoxidized safflower oil, epoxidized peanut oil, epoxidized linseed oil, epoxidized olive oil, epoxidized cod oil, epoxidized herring oil and epoxidized menhaden oil.

Epoxidized artificial esters of natural unsaturated fatty acids of requisite chain length may be reacted with vinyl carboxylic acids according to my invention. Illustrative examples are the methyl ester of 9,10-epoxy-stearic acid, the 2-ethylhexyl ester of 9,10–12,13-diepoxystearic acid and the phenyl ester of 5,6-epoxycapric acid. Other suitable classes of epoxy long chain aliphatic compounds, derivable by known methods from the natural unsaturated vegetable and animal oils, are the epoxidized constituent unsaturated fatty acids and the corresponding epoxy amides, nitriles, amines and alcohols obtained by replacing the carboxyl group with carbamyl, cyano, aminomethyl and hydroxymethyl group respectively. Illustrative examples are 9,10–12,13-diepoxystearic acid, 9,10–12,13-diepoxystearamide, 9,10-epoxystearonitrile, 9,10-epoxyoctadecylamine and 9,10–12,13 - diepoxyoctadecanol-1.

Mixtures of the foregoing individual epoxy long chain compounds may be used in the practice of my invention. Examples are the mixtures of epoxy glycerides in epoxidized natural unsaturated vegetable and animal oils and the mixture of epoxy higher fatty acids in epoxidized tall oil acids, or their esters.

As exemplified by the products of complete epoxidation of unsaturated natural glycerides containing more than one ethylenically unsaturated chain segments, e.g., soybean oil and linseed oil, the epoxy long chain compounds may contain more than one oxirane group and more than one aliphatic chain of 10–24 carbon atoms. Also, as exemplified by fully epoxidized glycerides of linoleic and linolenic acids, the compounds may have more than one oxirane group per long chain of 10–24 carbons. Furthermore, as exemplified by partially epoxidized glycerides of linoleic and linolenic acids, the long chain containing the necessary vicinal epoxy segment

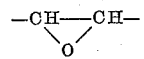

may also contain ethylenic unsaturation.

When the "Y" substituent of the long chain aliphatic compound, as defined before, is a carboxylate group, it may be represented by the general formula

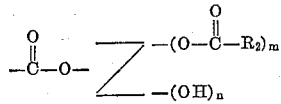

wherein Z is the residue of an esterifying hydroxy compound, $m$ is an integer ranging from 0 to 5, $n$ is an integer ranging from 0 to 5, the sum of $m$ and $n+1$ ranges from 1 to 6 (the number of hydroxyl groups in the esterifying hydroxy compound) and each $R_2$ is independently selected from the class consisting of hydrogen, monovalent aliphatic groups having from 1 to 24 carbon atoms and monovalent aromatic groups having from 6 to 18 carbon atoms.

The alcohols from which Z in the preceding formula may be derived can contain from 1 to 6 hydroxyl groups and from 1 to 24 carbon atoms. They can be saturated or ethylenically unsaturated. They may be open chain compounds such as n-butanol, glycerol, and sorbitol, or cyclic compounds such as furfuryl alcohol, cyclohexanol, and inositol. Among the suitable alcohols for this purpose are the monohydric alcohols ranging from methyl to lignoceryl, including the isomers in which the hydroxyl groups may be primary, secondary or tertiary. Among the many suitable dihydric alcohols are ethylene glycol, methylene glycol, and poloxyalklene glycols in which the oxyalkylene group has 1 to 3 carbon atoms, i.e., the polymethylene glycols, the polyethylene glycols and the polypropylene glycols. Additional suitable higher polyhydric alcohols are pentaerythritol, arabitol, mannitol, trimethylolpropane and trimethylolethane.

Suitable esters may also be obtained from aromatic hydroxy compounds such as phenol, the cresols, resorcinol, hydroquinone, naphthol, etc.

Included in the present invention is the vinylacylation of esters of polyhydric alcohols partially esterified with long-chain carboxylic acids. Examples of this are the acylation of monoglycerides and diglycerides containing a suitable long-chain group having at least one vicinal epoxy segment

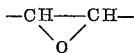

Also included in the invention is the vinylacylation of esters derived from a polyhydric alcohol and more than one acid species. For example, the glyceryl hydroxy groups in the foregoing epoxidized monoglycerides and diglycerides may be esterified with acids such as acetic acid, benzoic acid, stearic acid, oleic acid, etc. prior to vinylacylation.

Vinyl acids suitable for acylating the epoxy long chain compounds in accordance with my invention are represented by the following general formula:

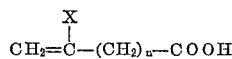

wherein X is a radical selected from the class consisting of hydrogen, lower alkyl, halogen, cyano, phenyl, benzyl and —CH$_2$—COO (alkyl) and $n$ is an integer ranging from 0 to 2. Illustrative examples of suitable vinyl acids conforming to the foregoing general structure are acrylic acid, methacrylic acid, alpha chloroacrylic acid, alpha bromoacrylic acid, alpha cyanoacrylic acid, alpha ethylacrylic acid, atropic acid, alpha benzylacrylic acid, vinyl acetic acid, allyl acetic acid, methyl acid itaconate, ethyl acid itaconate, n-butyl acid itaconate and 2-ethylhexyl acid itaconate. Acrylic and methacrylic acids are preferred because of their availability, low cost and provision of a vinyl group conjugated with a carbonyl group. This conjugation, present in acrylic acids which are not beta substituted, imparts a desirable reactivity to the vinyl group. The information presently available indicates that the acid itaconate esters are predominantly alpha substituted acrylic acids, having the structure

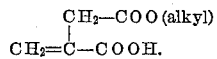

My method of acylating epoxy long chain compounds with aliphatic vinyl monocarboxylic acid is applicable over wide ratios of reactants. The ratio of mols of vinyl acid to gram atoms of oxirane oxygen may, for example, be as low as 0.01 or as high as 10. In some instances it may be desirable to modify the properties of an epoxy long chain aliphatic compound, e.g., fully epoxidized soybean oil, by a very low degree of acylation with a vinyl acid, e.g., methacrylic acid. No attempt would be made to separate acylated glyceride from the non-acylated epoxidized soybean oil. On the other hand, it may be desirable to use a high ratio of vinyl acid to epoxy compound, either to accelerate the acylation reaction by mass action or to provide unreacted vinyl acid in the reaction product. The excess vinyl acid may be removed from the reaction mixture by known methods, if desired. Among such methods are fractional distillation, preferably under vacuum, washing with aqueous alkali and selective extraction with an organic liquid. Alternatively, the excess vinyl acid may be allowed to remain in the reaction product and copolymerized later with other vinyl monomers, including the acylation products of the reaction, or with non-vinyl ethylenically unsaturated compounds such as maleic acid for example.

The physical and chemical characteristics of the polymerizable compounds obtained by acylating epoxy long chain compounds with vinyl acids according to my method can be altered substantially by choice of reactants and by control of extent of acylation. The range of properties thus obtained is useful for modifying the properties of derived homopolymers and copolymers.

The polymerizable vinylacyloxy-hydroxy compounds may be homopolymerized through their vinyl groups with known peroxide catalysts to form useful homopolymers. They may be copolymerized with other vinyl monomers and/or further polymerizable vinylated compounds by known methods of vinyl polymerization to yield useful polymeric products. They may also be copolymerized with non-vinyl ethylenically unsaturated compounds by known methods of polymerization to provide useful copolymers. Illustrative examples of copolymerizable vinyl monomers are methyl methacrylate, ethyl acrylate, butyl methacrylate, stearyl, acrylate, acrylic acid, methacrylic acid, strene, methylstyrene, allyl alcohol, vinyl acetate, vinyl stearate, acrylonitrile, butadiena and vinyl chloride. Illustrative examples of copolymerizable non-vinyl ethylenically unsaturated compounds are maleic acid, crotonic acid, cinnamic acid, dipentene, myrcene, and fumaric acid.

If the acylated compounds made according to my method contain residual oxirane groups, the compounds may be crosslinked through these groups by known methods to provide useful products. The homopolymers, copolymers and oxirane-crosslinked products are useful broadly as protective coatings, textile and paper additives and sizing agents, laminating resins, potting resins and adhesives. They also have utility in the manufacture of cast and extruded objects. Acylated compounds made according to my method and containing residual oxirane groups are also useful as stabilizer-plasticizers and as intermediates in the preparation of internally stabilized and plasticized resins. To function as a stabilizer-plasticizer for polyvinyl chloride, for example, the ester must possess an appreciable content of oxirane oxygen, be compatible with the resin and have a sufficiently low vapor pressure. Examples of esters meeting these requirements are those obtained by reacting a fully epoxidized vegetable oil, such as soybean oil, with less than one mol of acrylic acid per atom of oxirane oxygen. When such compounds are incorporated with polyvinyl chloride at the elevated temperatures normally required for this step, some homopolymerization usually occurs. The homopolymerization of the vinylacylated ester is a distinct advantage because it reduces the vapor pressure of the stabilizer-plasticizer and thus prolongs its retention in the resin.

The internally stabilized and plasticized resins may be obtained from the new compounds containing epoxy groups by homopolymerizing the latter, through their vinyl groups, or by copolymerizing them with other vinyl monomers. Such resinous products may be prepared either from the new compounds of medium molecular weight as, for example, those derived from vegetable oils, or from those of lower molecular weight such as the fully epoxidized n-butyl ester of linoleic acid.

Residual unreacted vinyl carboxylic acid may be present in the acylated products made according to my method. If present during subsequent vinyl polymerization, it readily homopolymerizes and/or copolymerizes with any polymerizable vinyl material to form homogeneous products. If desired, however, the residual vinyl carboxylic acid may be removed by vacuum distillation, solvent extraction, or by contact with an acid-adsorbing resin.

It will be apparent from the foregoing description that my method of acylating epoxy long chain aliphatic compounds with vinyl carboxylic acids yields compounds having one or more vinylacyloxy groups and one or more characteristic long chain alkyl groups. The method of my invention contemplates preparation of (1) separate molecular species of the vinylacylated long chain aliphatic compounds, (2) mixtures of such molecular species, and (3) the separate or mixed species mixed with compatible unreacted starting materials and/or compatible side reaction products thereof.

The following examples are illustrative embodiments of my invention.

Example 1

A mixture of 25.0 grams (0.10 equivalent of oxirane oxygen) of epoxidized soybean oil and 7.2 grams (0.10 equivalent of carboxyl) of acrylic acid (inhibited with 0.0072 gram of monomethyl ether of hydroquinone) was heated with vigorous mixing for one hour at 125° C. under a reflux condenser open to the atmosphere to admit air, and then cooled to room temperature. The cooled product was a viscous liquid which contained 2.13% oxirane oxygen (42% of the original content) and 1.42 milliequivalents/gram of acid (46% of the original acrylic acid). After being mixed with 1% benzoin and exposed to sunlight for two hours, the product polymerized to a clear, pale yellow, fairly tough, pliable solid.

Example 2

A mixture of 25.0 grams (0.1 equivalent of oxirane oxygen) of epoxidized soybean oil and 21.6 grams (0.3 equivalent of carboxyl) of acrylic acid (inhibited with 0.0216 gram of monomethyl ether of hydroquinone) was heated with vigorous mixing for one hour at 125° C. under a reflux condenser open to the atmosphere to admit air, and then cooled to room temperature. The cooled product, a viscous liquid, was transferred to a separatory funnel and diluted with ethyl ether. It was washed a number of times, first with aqueous 1% NaHPO$_4$, and then with aqueous 1% NaCl until free of acidity, and dried under vacuum by warming. The product was a highly-viscous oil which analyzed as follows:

Acid value (mg. KOH/g.) _____ 6.0
Saponification value (mg. KOH/g.) _____ 295
Oxirane oxygen (percent) _____ 0.20
Hydroxyl value (mg. KOH/g.) _____ 145

Infrared absorption spectrophotometry showed no evidence for the oxirane oxygen structure. The acrylate ester structure was very pronounced, but there was no absorption band for free acrylic acid. The most outstanding absorption was that due to the presence of hydroxyl groups. A small portion of the product was polymerized to a clear, tough, fairly hard solid by adding 1% benzoin and exposing it to sunlight for several hours. Another portion was heated at 60° C. for 12 hours with benzoyl peroxide as a catalyst. The polymer had an elastic modulus in torsion of 40,000 p.s.i. at 0° C. which dropped to 10,000 p.s.i. at 20° C. and 2,000 p.s.i. at 60° C. A third portion was copolymerized with an equal weight of styrene by heating at 60° C. for 12 hours using benzoyl peroxide as a catalyst. This clear, hard, slick-surfaced polymer had an elastic modulus in torsion of 222,000 p.s.i. at 40° C. which fell to 10,000 p.s.i. at 60° C.

Example 3

A mixture of 19.5 grams (0.05 equivalent of oxirane oxygen) of epoxidized soy fatty acid 2-ethylhexyl esters and 4.3 grams (0.05 equivalent of carboxyl) of methacrylic acid (inhibited with 0.0043 gram of hydroquinone) was heated with vigorous stirring for about ten minutes at 165–168° C. under a reflux condenser open to the atmosphere to admit air and then cooled to room temperature. The cooled product was a yellow, fluid liquid containing 2.4% oxirane oxygen (70% of the original content). By adding 1% benzoin to a portion of the product and exposing it to sunlight, a soft, almost wax-like polymer was formed. By adding 20% methyl methacrylate to another portion of the product and polymerizing as before a much tougher, elastic solid was formed. The addition of 20% butyl methacrylate to a third portion of the product followed by polymerization gave a very clear, tough, rubber-like solid.

Example 4

Two hundred and fifty grams (1.0 equivalent of oxirane oxygen) of epoxidized soybean oil was heated to 125° C. To this was added 86 grams (1.0 equivalent of carboxyl) of methacrylic acid inhibited with 0.172 gram of hydroquinone. The mixture was heated with vigorous agitation, under a reflux condenser open to the atmosphere to admit air, at 125° C. for 0.75 hour, then at 150° C. for two hours and then cooled to room temperature. The viscous product analyzed as follows:

Acid value (mg. KOH/g.) _____ 73
Saponification value (mg. KOH/g.) _____ 291
Oxirane oxygen (percent) _____ 0.48
Hydroxyl value (mg. KOH/g.) _____ 145

By adding 1% benzoyl peroxide to the product and heating it as 60° C. for six hours a fairly hard and tough, slightly pliable, clear, pale yellow polymer was formed. It had an elastic modulus in torsion of 140,000 p.s.i. at 40° C. which decreased to 10,000 p.s.i. at 140° C. A 50:50 copolymer of the product with methyl methacrylate was formed under the above conditions. It had an elastic modulus in torsion of 300,000 p.s.i. at 40° C. which decreased to 10,000 p.s.i. at 90° C. A 50:50 copolymer of the product with styrene formed under the same conditions was a very hard, tough, clear, pale yellow solid.

Example 5

A mixture of 50 grams (0.2 equivalent of oxirane oxygen) of epoxidized soybean oil and 28.8 grams (0.2 equivalent of carboxyl) of monomethyl itaconate containing 0.016 grams of paramethoxyphenol was heated with vigorous stirring under a reflux condenser open to the atmosphere to admit air for 1.25 hours at 170° C. and then cooled to room temperature. The cooled product was a viscous liquid containing 0.05% oxirane oxygen (1% of the original content) and 0.96 milliequivalent/gram of acid (38% of the original content). After adding 1% benzoin to the product and exposing it to sunlight, the product polymerized to a clear, fairly hard, pliable solid. By adding 1% benzoyl peroxide to a part of the product and heating it at 65° C. for 4.5 hours, a much harder, less pliable, clear solid polymer was obtained.

Example 6

A slurry of 0.09 grams (0.0014 moles) of zinc dust in 244 grams (1.0 moles of oxirane oxygen) of epoxidized soybean oil was prepared. Then 0.192 grams of monomethyl ether of hydroquinone (MEHQ) was dissolved in 129 grams (1.5 moles) of methacrylic acid (inhibited with 0.025% MEHQ) and added to the epoxidized soybean oil. The mixture was heated with vigorous agitation to 128–130° C. under a reflux condenser open to the atmosphere to admit air and maintained at this temperature for 1.5 hours while stirring. The following data were obtained on the cooled liquid product:

Free methacrylic acid, wt. percent _____ 20.0
Oxirane oxygen, wt. percent _____ 0.25
Saponification value, meq./g _____ 6.00
Refractive index, $n_D{}^{45}$ _____ 1.4640
Density, $d_4{}^{35}$ _____ 1.035
Viscosity, poise @ 25° C _____ 28.0

A portion of the product was cured to a clear, pale yellow, tough, pliable polymer by incorporating 1% benzoyl peroxide and heating at 60° C. for 16 hours. By copolymerizing a portion under similar conditions with 33.3% styrene a tougher, harder, more rigid product was formed.

Example 7

A slurry of 0.045 grams (0.0007 moles) of zinc dust in 182 grams (0.50 moles of oxirane oxygen) of epoxidized tall oil fatty acid isooctyl esters was prepared. Then 0.132 grams of MEHQ was dissolved in 64 grams (0.75 moles) of methacrylic acid (inhibited with 0.025% MEHQ) and added to the epoxidized soybean oil. The mixture was heated with vigorous stirring at 128°–130° C. for 2.5 hours under a reflux condenser open to the atmosphere to admit air. The following data were obtained on the cooled product:

Free methacrylic acid, meq./g ------------------ 1.88
Oxirane oxygen, meq./g ----------------------- 0.47
Saponification value, meq./g ------------------- 4.69

To 10.0 grams of the clear, yellow liquid product was added 3.3 grams of styrene and 0.1 gram of benzoyl peroxide. By heating at 100° C. for 2 hours a very tough, flexible, clear thermoset polymer was formed.

Example 8

A mixture of 25.00 grams (53 millimoles of oxirane oxygen) of epoxidized soybean oil fatty acid monoglyceride, 6.88 grams (80 millimoles) of methacrylic acid (inhibited with 0.025% MEHQ), 0.01 gram of added p-methoxyphenol was heated with stirring and air sparging at 125° C. for 2.5 hours. The cooled product analyzed 0.71 meq./g. oxirane oxygen and 1.55 meq./g. acid (indicating 55% methacrylation). By adding 1% benzoyl peroxide to a portion of the product and heating at 115° C. for one hour, a clear, tough, pliable polymer was formed. Similarly, by curing a mixture of the product and 33 wt. percent styrene at 115° C. for one hour with 1% benzoyl peroxide, a clear, tough, pliable copolymer was formed.

Example 9

A mixture of 20.00 grams (54 millimoles of oxirane oxygen) of epoxidized soybean oil fatty alcohol, 6.95 grams (81 millimoles) of methacrylic acid (inhibited with 0.025% MEHQ), 0.63 grams (0.5 millimole) of zinc dust, and 0.027 grams (0.1% wt. percent total mixture) of p-methoxyphenol was heated with stirring and air sparging at 125° C. for 1.5 hours. Analyses of the cooled product indicated 52% methacrylation of the fatty alcohol.

Free methacrylic acid, meq./g ------------------ 1.51
Saponification value, meq./g ------------------- 1.08
Oxirane Oxygen, meq./g ------------------------ 0.79

One percent benzoyl peroxide was added to a portion of the liquid product which was then heated at 75° C. for five hours. A fairly tough, clear, pale yellow, pliable polymer was formed.

Example 10

A solution of 0.344 grams (0.06 wt. percent total mixture) of MEHQ in 86 grams (1.0 moles) of methacrylic acid was added to a mixture of 0.141 grams (0.0022 moles) of zinc dust in 488 grams (2.0 moles of oxirane oxygen) of epoxidized soybean oil. The reactants were heated with stirring and air sparging at 125° C. for 1.5 hours. After cooling to room temperature the product analyzed as follows:

Free methacrylic acid, wt. percent -------------- 5.80
Oxirane oxygen, wt. percent -------------------- 2.77
Saponification value, meq./g ------------------- 4.19

A small portion of this clear, viscous liquid product was heated with 1% benzoyl peroxide at 100° C. for 2.5 hours to form a clear, very flexible, fairly soft thermoset polymer. The polymer had an elastic modulus in torsion of 10,000 p.s.i. at −3° C.

Example 11

A mixture of 18,182 grams of epoxidized soybean oil (6.4% by weight oxirane oxygen), 20.4 grams of zinc sulfoxylate formaldehyde, 9,451 grams methacrylic acid and 10.9 grams of hydroquinone were agitated with a stirrer at 100 r.p.m. in a 10-gallon steam jacketed kettle, which was equipped with an air sparge line entering the bottom of the kettle. The air sparge line was opened to admit 0.25 cubic feet of air per minute in the form of small bubbles. Steam at 60 p.s.i.g. was admitted to the kettle jacket and after 15 minutes the reaction reached 150° C. After 30 minutes at 150° C., the charge was cooled to 70° C., filtered and then poured into a 10-gallon container. It has been found that the addition of about 20 grams of sulfur dioxide at this point enhances the storage stability of the product. The product was a pale yellow liquid having the following properties: acidity (as methacrylic acid)—2.50 meq./g., total vinyl groups—3.75 meq./g., vinyl groups in oil were 47 mole percent of theory and oxirane oxygen—0.10 meq./g.

Experimental evidence is to the effect that, at the concentration of the inhibitor used in this example, sparging with from about 0.003 to 0.2 cubic feet of air per minute (measured at S.T.P.) per gallon of reaction mixture is sufficient to prevent polymerization under normal reaction conditions where an open reactor is employed. However, it is generally preferable to use from about 0.006 to 0.052 cubic feet of air per minute per gallon of reaction mixture. Higher rates of air sparging can be used. However, as the rate of air sparging is increased, more color is imparted to the product, probably by oxidation of the inhibitor, and this may be accompanied in some cases by the product having a longer induction period.

Example 12

A mixture of 244 grams of epoxidized soybean oil having 6.57% by weight oxirane oxygen, 129 grams of glacial methacrylic acid, 0.224 gram of paramethoxyphenol and 0.58 gram of zinc hydrosulfite is heated for 1.5 hours at 128°–130° C. with continuous air sparging and mechanical stirring in a flask under a reflux condenser. After cooling to room temperature the product is a pale yellow viscous liquid with the following properties: acidity (as percent by weight methacrylic acid)—20.1; vinylation (from saponification values)—54.8% of theory; Brookfield viscosity at 25° C.—3490 centipoises; refractive index—1.464; oxirane oxygen—0.25% by weight.

Example 13

Example 12 is repeated except for replacing the 0.58 gram of zinc hydrosulfite with 0.28 gram of basic zinc sulfoxylate formaldehyde. Appearance and analytical values of the reaction product are substantially the same as those of the Example 12 product.

Example 14

Example 13 is repeated except for conducting the heating and stirring of the reactants at 148–150° C. for 30 minutes instead of 128–130° C. for 90 minutes. The appearance and analytical properties of the product are substantially the same as those of the Example 12 and Example 13 products.

Example 15

Example 14 is repeated. At the end of the 30-minute reaction period, 0.2 gram of paramethoxyphenol are added to the hot product and unreacted methacrylic acid is vacuum distilled from the product with continued stirring and air sparging. When the reduced pressure reaches 100 mm. of mercury, air sparging is replaced with steam sparging. While maintaining the reaction product at about 90° C., and continuing the steam sparging, the reaction flash pressure is gradually reduced from 100 mm. of mercury to about 10 mm. of mercury. The final product is a viscous yellow oil having the following analytical values: acidity (as percent by weight methacrylic acid)—0.35.

*Example 16*

Example 14 is repeated except for replacing the 0.28 gram of basic zinc sulfoxylate formaldehyde with a mixture of 0.38 gram of sodium sulfoxylate formaldehyde and 0.68 gram of zinc hydrosulfite. The cooled reaction product is a viscous light yellow having the following analytical values: acidity (as percent by weight methacrylic acid)—21.1; vinylation (from acidity and total vinyl content by near infrared absorption)—51.3% of theory; Brookfield viscosity at 25° C.—2570 centipoises; refractive index—1.465; oxirane oxygen—0.18% by weight.

This application is a continuation-in-part of my application Serial No. 800,071, filed March 8, 1959, in which there are claims directed to certain of the compounds produced by the method of the present invention. Many of the compounds can be produced by other methods, for example, by esterifying vicinal dihydroxy compounds with an acyl halide.

Since many embodiments of this invention can be made and since many changes can be made in the embodiments described, the foregoing is to be interpreted as illustrative only and my invention is defined by the claims appended hereafter.

I claim:

1. The method of preparing a polymerizable vinylated monomer which comprises reacting an epoxidized ester of an alcohol and a higher aliphatic carboxylic acid with a vinyl aliphatic monocarboxylic acid of the formula

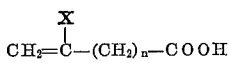

wherein $n$ is an integer ranging from 0 to 2 and X is a group selected from the class consisting of hydrogen, lower alkyl, phenyl, benzyl, halogen, cyano and —CH$_2$—COO (alkyl) in the presence of phenolic free radical inhibitor and of gaseous oxygen, said inhibitor and oxygen cooperating to inhibit vinyl polymerization, said higher aliphatic carboxylic acid having a chain of 10–24 carbon atoms, whereby said epoxidized ester is acylated with the carboxyl group of said vinyl acid at an oxirane segment

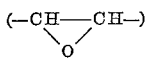

2. The method of claim 1 wherein the epoxidized ester and vinyl acid are reacted in the presence of an acylation catalyst.

3. The method of claim 2 wherein the reaction temperature is 75–175° C.

4. The method of claim 3 wherein the reaction mixture contains initially about 0.001–0.25% by weight of phenolic free radical inhibitor and about 0.0005–0.01 gram mole of acylation catalyst per gram mole of oxirane oxygen.

5. The method of claim 1 wherein the alcohol is glycerol and the higher aliphatic carboxylic acid is a naturally occurring higher fatty acid.

6. The method of claim 1 wherein the epoxidized ester is epoxidized soybean oil.

7. The method of claim 1 wherein the vinyl acid has the structure CH$_2$=CH—COOH.

8. The method according to claim 1 wherein the vinyl acid has the structure CH$_2$=C(CH$_3$)—COOH.

9. The method of preparing a polymerizable vinylated long chain organic compound which comprises reacting an epoxy compound having the structure

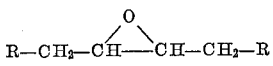

wherein

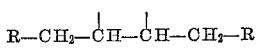

is an aliphatic open chain of from 10 to 24 carbon atoms and each R is selected from the group consisting of hydrogen and a monovalent aliphatic group, with a vinyl aliphatic monocarboxylic acid of the formula

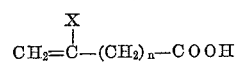

wherein $n$ is an integer ranging from 0 to 2 and X is a group selected from the class consisting of hydrogen, lower alkyl, phenyl, benzyl, halogen, cyano, and —CH$_2$—COO (alkyl) in the presence of free radical inhibitor and of gaseous oxygen, said inhibitor and oxygen cooperating to inhibit vinyl polymerization, whereby said organic compound is acylated with the carboxyl group of said vinyl acid at a

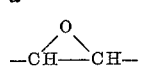

segment.

10. The method of claim 9 wherein the free radical inhibitor is a phenolic compound.

11. The method of claim 10 wherein the phenolic free radical inhibitor is paramethoxyphenol.

12. The method of claim 10 wherein the phenolic inhibitor is hydroquinone.

13. The method of claim 9 wherein

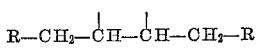

is substituted by a carboxylate group.

14. The method of claim 9 wherein the vinyl acid has the structure CH$_2$=CH—COOH.

15. The method of claim 9 wherein the vinyl acid has the structure

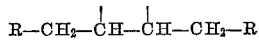

16. The method of claim 9 wherein the epoxy compound and the vinyl acid are reacted in the presence of an acylation catalyst.

17. The method of claim 16 wherein the acylation catalyst is selected from the group consisting of powdered zinc, zinc hydrosulfite, zinc sulfoxylate formaldehyde, sodium sulfoxylate formaldehyde and mixtures thereof.

18. The method of claim 16 wherein the reaction temperature is 75–175° C.

19. The method of claim 18 wherein the reaction mixture contains initially about 0.001–0.25% by weight of free radical inhibitor and about 0.0005–0.01 gram mole of acylation catalyst per gram mole of oxirane oxygen.

References Cited in the file of this patent

UNITED STATES PATENTS

| 2,141,546 | Strain | Dec. 27, 1938 |
| 2,752,376 | Julian et al. | June 26, 1956 |
| 2,909,537 | Chatfield | Oct. 20, 1959 |

FOREIGN PATENTS

| 805,367 | Great Britain | Dec. 3, 1958 |

UNITED STATES PATENT OFFICE
CERTIFICATE OF CORRECTION

Patent No. 3,125,592                                     March 17, 1964

Charles S. Nevin

It is hereby certified that error appears in the above numbered patent requiring correction and that the said Letters Patent should read as corrected below.

Column 2, line 50, for "polyemrized" read -- polymerized --; column 4, line 65, for $(NaHSO_2 \cdot CH_2 \cdot 2H_2O)$      read      $(NaHSO_2 \cdot CH_2O \cdot 2H_2O)$ line 74, for "use" read -- used --; column 7, line 6, for "poloxyalklene" read -- polyoxyalkylene --; column 8, line 24, after "stearyl" strike out the comma; line 25, for "strene" read -- styrene --; line 26, for "butadiena" read -- butadiene --; column 10, line 26, for "as" read -- at --.

Signed and sealed this 21st day of July 1964.

(SEAL)
Attest:

ESTON G. JOHNSON
Attesting Officer

EDWARD J. BRENNER
Commissioner of Patents